(12) United States Patent
Guard (10) Patent No.: US 7,364,050 B2
(45) Date of Patent: Apr. 29, 2008

(54) MOBILE VENDING

(75) Inventor: Tony M. Guard, Union, KY (US)

(73) Assignee: Gravity, Incorporated, Cincinnati, OH (US)

(*) Notice: Subject to any disclaimer, the term of this patent is extended or adjusted under 35 U.S.C. 154(b) by 245 days.

(21) Appl. No.: 11/221,600

(22) Filed: Sep. 7, 2005

(65) Prior Publication Data

US 2006/0049198 A1 Mar. 9, 2006

Related U.S. Application Data

(60) Provisional application No. 60/653,371, filed on Feb. 17, 2005, provisional application No. 60/607,453, filed on Sep. 7, 2004.

(51) Int. Cl.
*G07F 11/00* (2006.01)
(52) U.S. Cl. .................. 221/131; 221/150 R; 296/22
(58) Field of Classification Search ............ 221/150 R, 221/131; 296/22
See application file for complete search history.

(56) References Cited

U.S. PATENT DOCUMENTS

| | | | | |
|---|---|---|---|---|
| 2,733,094 A | * | 1/1956 | Carlton ...................... | 296/22 |
| 3,057,489 A | * | 10/1962 | Gilliam, Jr. ................ | 414/528 |
| 4,236,747 A | | 12/1980 | Ratliff ....................... | 296/24 R |
| 4,270,319 A | * | 6/1981 | Spasojevic .................. | 52/36.2 |
| D261,431 S | | 10/1981 | Barton ........................ | D25/10 |
| 5,727,352 A | * | 3/1998 | Bared et al. ................ | 52/79.1 |
| 5,884,957 A | | 3/1999 | Shoen et al. ............... | 296/37.1 |
| 6,189,944 B1 | | 2/2001 | Piche .......................... | 296/22 |
| 6,199,549 B1 | | 3/2001 | Yerkes ....................... | 126/276 |
| 6,263,674 B1 | | 7/2001 | Fileman et al. ............ | 60/641.9 |
| 6,345,852 B1 | * | 2/2002 | McCarthy .................... | 296/22 |
| 6,540,100 B2 | | 4/2003 | Credle, Jr. et al. ........... | 221/2 |
| 6,742,673 B2 | | 6/2004 | Credle, Jr. et al. ........... | 221/88 |
| 6,752,088 B2 | | 6/2004 | Poarch et al. ............... | 108/44 |

OTHER PUBLICATIONS

The Included Derwent Summary.*

* cited by examiner

*Primary Examiner*—Gene O. Crawford
*Assistant Examiner*—Timothy R Waggoner
(74) *Attorney, Agent, or Firm*—Haverstock, Garrett & Roberts LLP (57) ABSTRACT

The mobile vending apparatus can be transported to a desired venue such as a festival grounds, sports park, or the like, and is quickly and easily rendered operational for use by persons standing at ground level. The apparatus can include individual automatic vending units having lowered controls so as to be reachable from ground level, or the apparatus can include devices for lowering conventional vending machines to the ground or another surface.

23 Claims, 9 Drawing Sheets

MOBILE VENDING

This application claims the benefit of U.S. Provisional Application No. 60/607,453, filed Sep. 7, 2004, and also U.S. Provisional Application No. 60/653,371, filed Feb. 17, 2005.

TECHNICAL FIELD

This invention relates generally to mobile automatic vending apparatus, and more particularly, to a vehicle configured for travel over public roads to a location such as a parking lot, street, festival or fair grounds, or the like, and parked. The vehicle includes a plurality of automatic product vending units or stations which, in several embodiments remain on the vehicle and have user operable controls and product dispensers positioned for use by persons standing on a surface on which the vehicle is located, and in other embodiments are supported on apparatus for lowering the units to, or closer to, the surface for use by persons standing on the surface.

BACKGROUND OF THE INVENTION

In vending services today, the opportunity for adaptability is limited. Typical vending today happens with independent vending machines placed in specific locations. These vending machines are then serviced independently over a number of months/years, all while remaining in the same location. These locations can be inside or outside but require "chance" buyers (chance meaning the consumer "might" pass by and purchase) Another major factor in the placement of these independent machines is the effort needed to transport and place each unit. This is typically done by manual labor with the use of a dolly. The units are of well known construction including a self-standing structure having user operated controls on a front surface thereof including at least one product selector control, a payment receiving and validating control, and a product vending outlet. The vending units require a supply of electricity, and the controls are configured use by persons standing on a surface at or about the same level as a surface on which the unit is located. In this latter regard, the current controls are located within an area of between about 10 inches and about 80 inches above a surface on which the unit is located, which is required as a result of the gravity feed nature of the machines, but which is not ergonomically desirable.

In large venues such as festivals, concerts, professional and recreational sporting events, or any other large venue, when vending has a presence, the known units are typically brought in individually, and require a great deal of effort for placement, usually for a short time frame, and can require a secondary enclosure for protection against weather and vandalism.

It is known to provide a mobile capability for transporting the known vending units. Reference in this regard, McCarthy U.S. Pat. No. 6,345,852, which discloses a mobile vending assembly including a wheeled structure having a bay for receiving a vending machine and a door for enclosing the bay and having an opening or openings for accessing vending controls of a vending machine located in the bay. An observed shortcoming of this wheeled assembly, however, is that it is configured to significantly raise the vending units above a ground or pavement surface on which the wheeled assembly is located, so as to undesirably position some of the user operable controls at relatively high positions above a surface on which the wheeled assembly is located, making the controls difficult to reach or unreachable by persons, particularly shorter persons and children. Another shortcoming is the effort required to fill or restock the vending machine, which requires opening of both the door of the enclosure and the vending machine itself. U.S. Pat. No. 6,345,852 discloses an alternative construction wherein the structure is directly located on the ground. However, this construction would require a fork lift or the like for movement from and onto a truck or trailer used for transporting it.

Thus, what is sought is mobile vending apparatus which can be transported to a desired venue such as a festival grounds, sports park, or the like, and is quickly and easily rendered operational for use by persons standing at ground level, including shorter persons and children, and which otherwise overcomes one or more of problems and shortcomings set forth above.

SUMMARY OF THE INVENTION

What is disclosed is mobile vending apparatus which can be transported to a desired venue such as a festival grounds, sports park, or the like, and is quickly and easily rendered operational for use by persons standing at ground level, and which otherwise overcomes one or more of problems and shortcomings set forth above.

According to one preferred aspect of the invention, a mobile vending apparatus includes one or more vending units or machines that would be attached to or contained in a transportable structure or surface or platform that could be attached to or pulled by a motor vehicle towing device. This would allow the vending owner or operator to transport a large amount of vending options simultaneously to and from events that may require a short stay (hours/days) in comparison to the traditional vending machine's placement time frame (months/years) or to places currently unavailable to vending. In one option, user operable controls for the vending unit(s) located on the transportable surface or platform are at lower elevations, sufficiently close to the ground or another surface on or over which the transportable surface or platform is temporarily placed, such that users standing on the ground or other surface can easily operate the controls, in contrast to traditional vending machines where the controls are placed sufficiently high for convenient access by users standing on the surface on which the vending machine itself is located, but would be difficult or impossible to use by persons standing on a surface located about a foot or more below the surface on which the machine is located.

Several options according to the invention include: (1) a custom built vending truck that would have built-in vending and could be parked and left wherever there was access; (2) a truck that would be adapted to use existing vending machines by attaching them to it; (3) a trailer with built-in vending (custom or retrofitted to use existing machines) that could be pulled by a truck and left in a location independently; (4) at least one platform that would have existing or custom vending units that would raise and lower using hydraulics or the like; (5) a platform with built-in vending (custom or retrofitted to use existing machines) that could be transported by a vehicle and removed for placement during an event (in this option, the platform would have smaller wheels for transporting shorter distances); and (6) an option that would include the variations included in the previous options 1-5, however, this option would be adapted in a smaller scale (an example would be a golf cart). Each of these options could have built-in power or use existing on-site power for refrigeration, lighting and power needs. For instance, as a built-in power option the apparatus can include a refrigerated enclosure having a central refrigeration unit powered by a fossil fuel powered engine, which also generates electrical power that is routed to the vending units for powering those devices. The vending units could be serviced and restocked from the outside or inside of the unit or structure. The units can include a wide variety of payment receiving and validating controls, including, but not limited to, well known commercially available coin acceptors, bill validators, change makers, credit and/or debit card readers, as well as other devices including those for built-in currency dispensing and/or accepting credit cards via wireless technology. Some of the uses could be for festivals, construction sites, sporting events, golf courses, etc. These units could also be set up to dispense any item or product that could maximize the advantages of taking the product to the consumer with minimal labor.

A preferred embodiment of a custom vending truck would have the following advantages: it could be placed anywhere accessible by a wheeled vehicle; the unit does not require permanent labor; the entire unit could be refrigerated; all user controls and buttons would be at a standard or conveniently reachable height and the product dispenser opening could be higher without requiring bending down to reach a vended product; the vending unit is completely self-contained and operable; the unit could be refilled from the outside or within the unit (door in rear/cab). Custom vending allows the ability to vend any product including, but not limited to, cold, warm, dry, liquid, food, and general merchandise products.

In another preferred embodiment, a bank of existing vending units or a custom bank of units would be attached to a platform and would raise and lower using hydraulics or a like mechanism. In this option, the controls would be in the traditional locations. This would alleviate the need for modification of existing vending units.

DETAILED DESCRIPTION OF PREFERRED EMBODIMENTS

Figure 1:
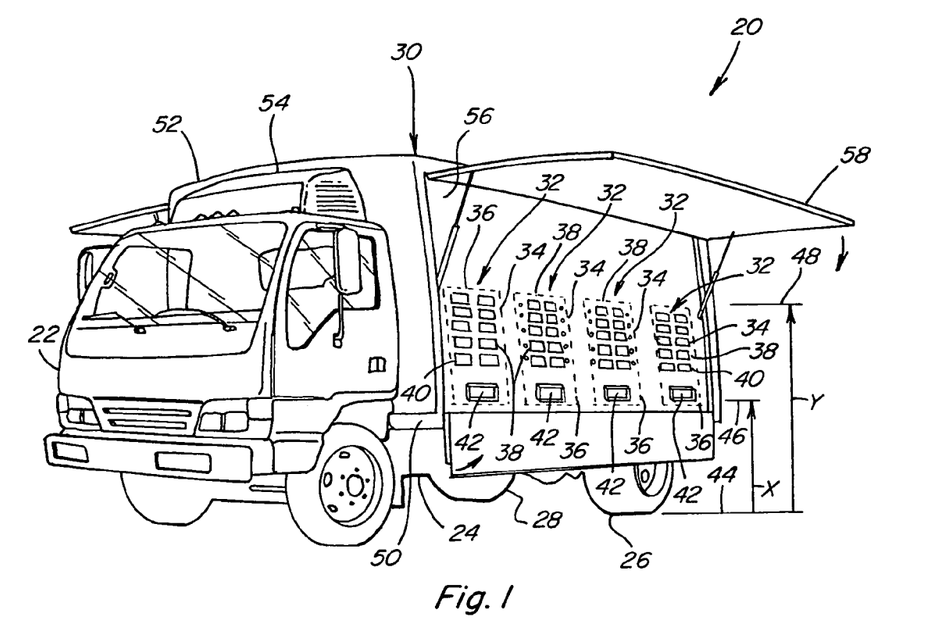
FIG. 1 is simplified perspective view of one mobile vending apparatus of the invention.

Referring now to the drawings wherein like numbers refer to like parts, in FIG. 1, a mobile vending apparatus 20 constructed and operable according to the teachings of the present invention is shown. Apparatus 10 is shown here as including a conventional truck cab 22 supported on a chassis 24, including an engine and drive line (not shown) operable for drivingly rotating a pair of rear wheels 26 and 28 in the well known conventional manner. Chassis 24 supports a mobile support structure 30, which, in turn, supports at least one, and preferably a plurality of, automatic product vending units 32 having front surfaces 34 in at least a generally upstanding orientation as shown.

Figure 2:
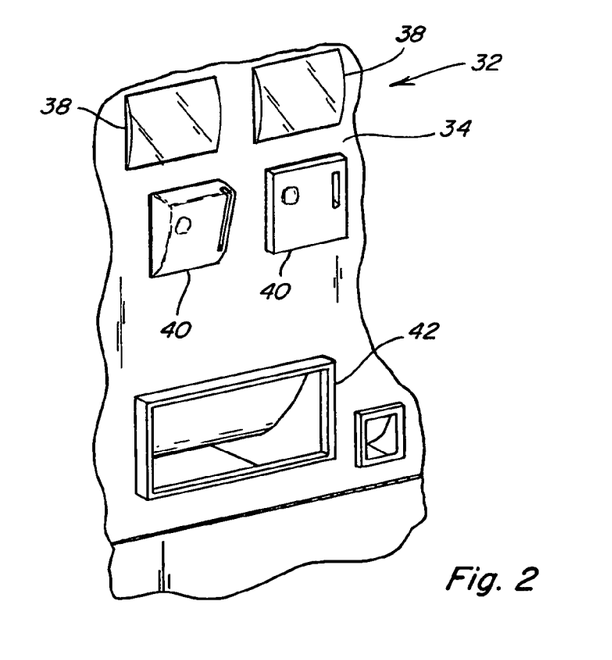
FIG. 2 is an enlarged fragmentary perspective view of a vending unit of the apparatus of FIG. 1.

Referring also to FIG. 2, front-surface 34 of each vending unit 32 has a user interface region 36 preferably including an array of user operable controls including at least one and more preferably a plurality of manually operable product selector controls 38, which can each be for instance, a button which is pushed to select a product; at least one and more preferably two payment receiving controls 40, which can be, for instance, well known commercially available and operable devices for receiving payment in coins (illustrated by control 40 on the right hand side which is a coin acceptor and validator), or bills (illustrated by control 40 on the left hand side which is a bill reader and validator), and/or a credit and/or debit card reader/validator, or the like, controls 38 and 40 including or being in connection with a vend control (not shown) also operable in the well known manner for automatically vending a product or products when a predetermined payment is received and validated and a product is selected, the product being dispensed through a product dispenser outlet 42.

Referring more particularly to FIG. 1, a line 44 is shown extending horizontally from a lowest peripheral portion of a wheel 26 located adjacent to a rearmost vending unit 32. Line 44 represents the lowest peripheral portion of the wheel 26, and also the level of a surface such as a ground or pavement surface on which wheel 26 is located when mobile apparatus 20 is moving or parked. User interface region 36, including all of the user operable controls 38 and 40 and outlet 42, of each vending unit 32, is preferably contained within about a lower one-half of a vertical extent of the front surface of the unit 32. User interface region 36 is also preferably at least substantially within a predetermined range of vertical distances above line 44, as represented by a minimum distance X and a maximum distance Y, such that all of the controls 38 and 40 are easily reachable by a person, including at least an older child or short person, standing on a surface coincident with or in close proximity to line 44. Here, distance X is preferably equal to at least about 10 inches, or within a range of from about 10 to about 40 inches, and distance Y is equal to no more than about 80 inches, and is preferably within a range of from about 50 to about 66 inches. A preferred range for user interface region 36 is between a value for distance X of about 20 inches, and a value for distance Y of about 66 inches, and is more preferably between a value for distance X of about 24 inches, and a value for distance Y of about 66 inches, which has been found to provide an ergonomic advantage in that less bending or stooping down is required, particularly to retrieve vended articles, and less reaching up is required, compared to conventional machines positioned on the ground or another surface on which the user is also standing. Also, it is believed that a vending transaction can be completed and the vended product obtained in a more expedient manner, to facilitate crowded conditions wherein lines may form at the vending units.

Mobile apparatus 20 is contemplated to be moved over ground surfaces such as grass fields of fair grounds, festival grounds, parks and the like, and also over paved surfaces such as public roads and thoroughfares including highways at legal speeds. To facilitate and enable legal movement over such public roads carrying mobile support structure 30 including several at least partially loaded vending units 32, wheels 26 and 28 are preferably conventional commercial truck or trailer wheels, including pneumatic tires commonly having overall vertical extents or diameters of 12 inches or more, and more preferably of 24 inches or more. As a result, mobile apparatus 20 is contemplated to be capable of being driven to a location such as a park, festival ground, fair ground, or the like, and quickly and easily parked with wheels 26 and 28 supported on a suitable ground or paved surface, and such that user interface region 36 of each of the vending units 32 will be located within the desired range of from the distance X to the distance Y above the surface.

Support structure 30 shown in FIG. 1 includes a platform 50 supporting a refrigerated enclosure 52 having a central refrigeration unit 54 for supplying refrigerated air to the contents of the enclosure. Units 32 are integrated into a side 56 of enclosure 52, and can be serviced and filled from an interior thereof. Units 32 can be configured for vending a wide variety of products, including but not limited to, soft drinks, sports drinks, candy, food products, and general merchandise, as desired. Units 32 located on one side 56 of enclosure 52 can be used for vending the same or different products.

Figures 1A, 1B:
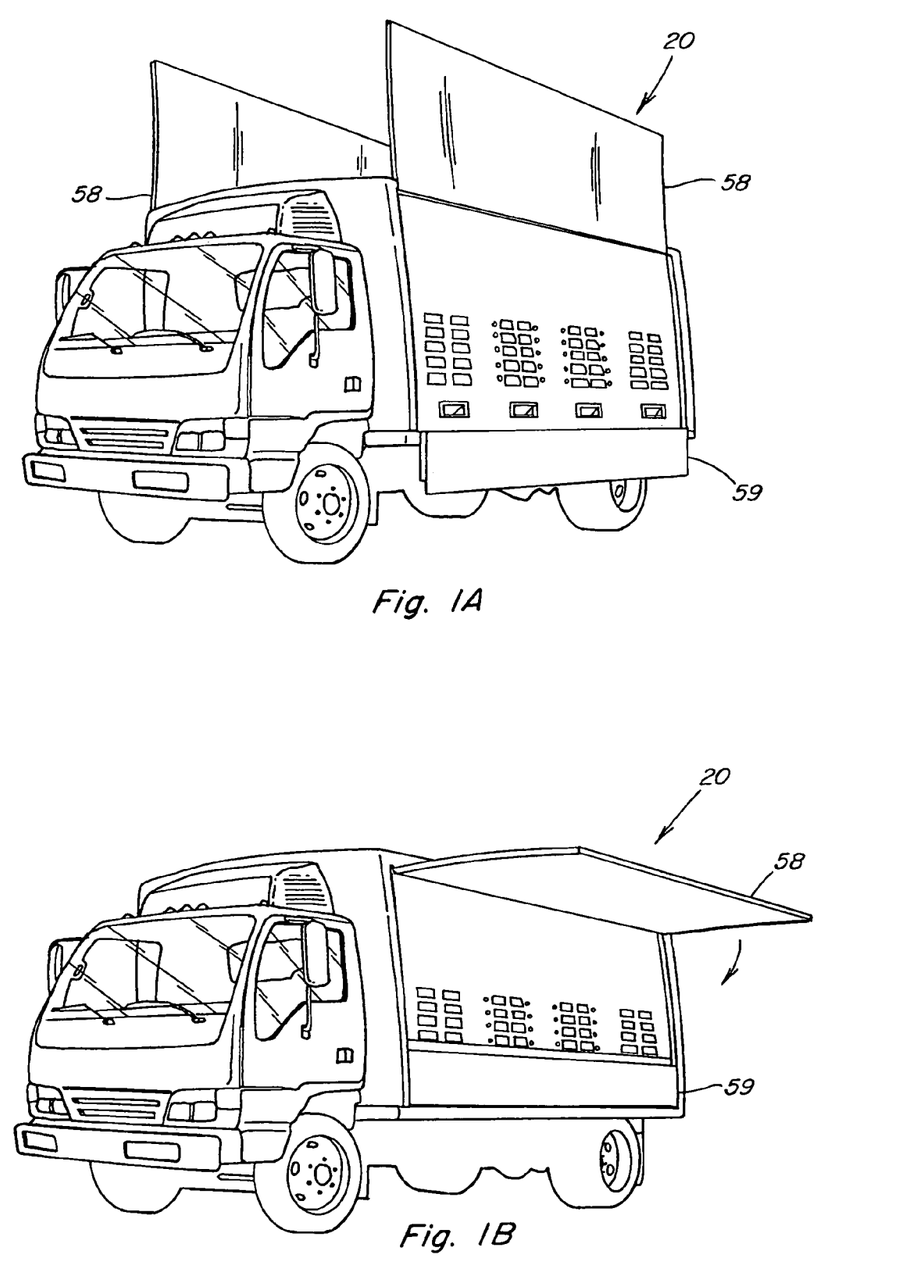
FIG. 1A is another simplified perspective view of the mobile vending apparatus of FIG. 1, showing a cover panel for a side thereof in an alternative position.
FIG. 1B is another simplified perspective view of the mobile vending apparatus of FIG. 1, showing a skirt for a side thereof in an alternative position.
Figure 1C:
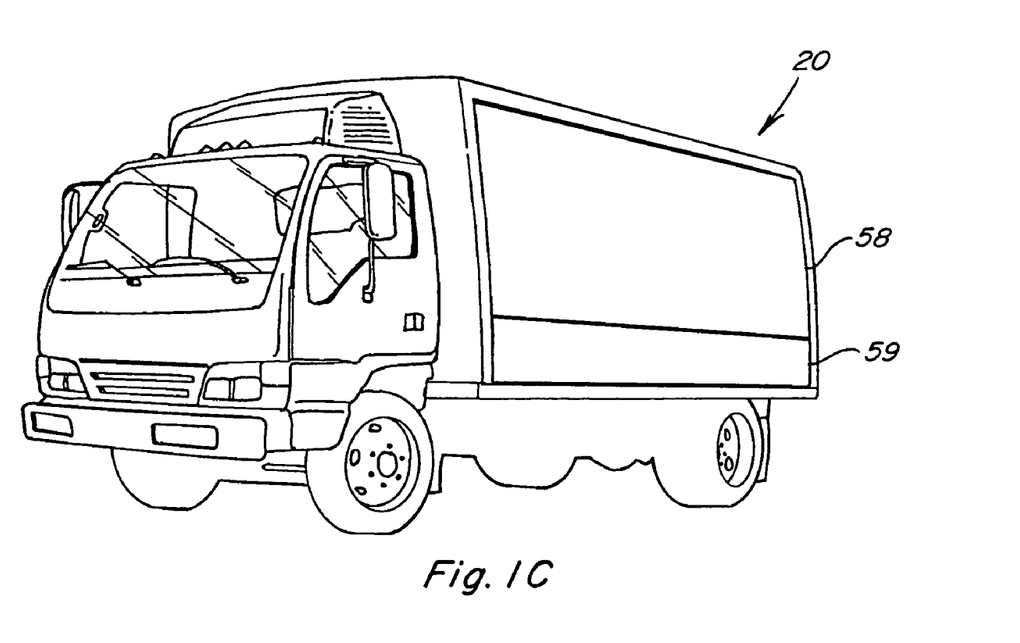
FIG. 1C is still another simplified perspective view of the mobile vending apparatus of FIG. 1, showing a cover panel and a skirt thereof in closed positions covering a side of the apparatus.

In FIG. 1, a cover panel 58 is shown mounted on side 56 in an open or first position above units 32, so as to serve as an awning or shade. A skirt 59 is shown mounted on side 56 extending downwardly below units 32 in a first position thereof, to at least partially cover wheel 26, for aesthetics as well as for protecting users from dirt that may be on wheel 26 and lower external regions of structure 30. Both cover panel 58 and skirt 59 are contemplated to be pivotally or hingedly mounted, so as to be capable of being pivoted to closed or second positions in at least partial covering relation to units 32. In FIG. 1A, cover panel 58 is illustrated in an alternative position extending upwardly from support structure 30, so as to serve as an elevated location for signage or the like, to provide visibility in crowded areas and at long distances. In FIG. 1B, cover panel 58 is illustrated by the arrow as being pivotable from the positions of FIGS. 1 and 1A downwardly toward a closed position, skirt 59 being shown pivoted to its closed position. In FIG. 1C, cover panel 58 is shown in its closed position, overlapping a top lip of skirt 59. With cover panel 58 and skirt 59 as shown here, the vending units are completely covered and protected, for instance for storage when not in use, and for transport over roads and the like where they may otherwise be subject to dirt, pollution, rain and road spray, and the like. Cover member 58 and skirt can be retained in the positions shown using suitable conventional devices such as gas cylinders, prop rods, detents, and the like.

Figure 3:
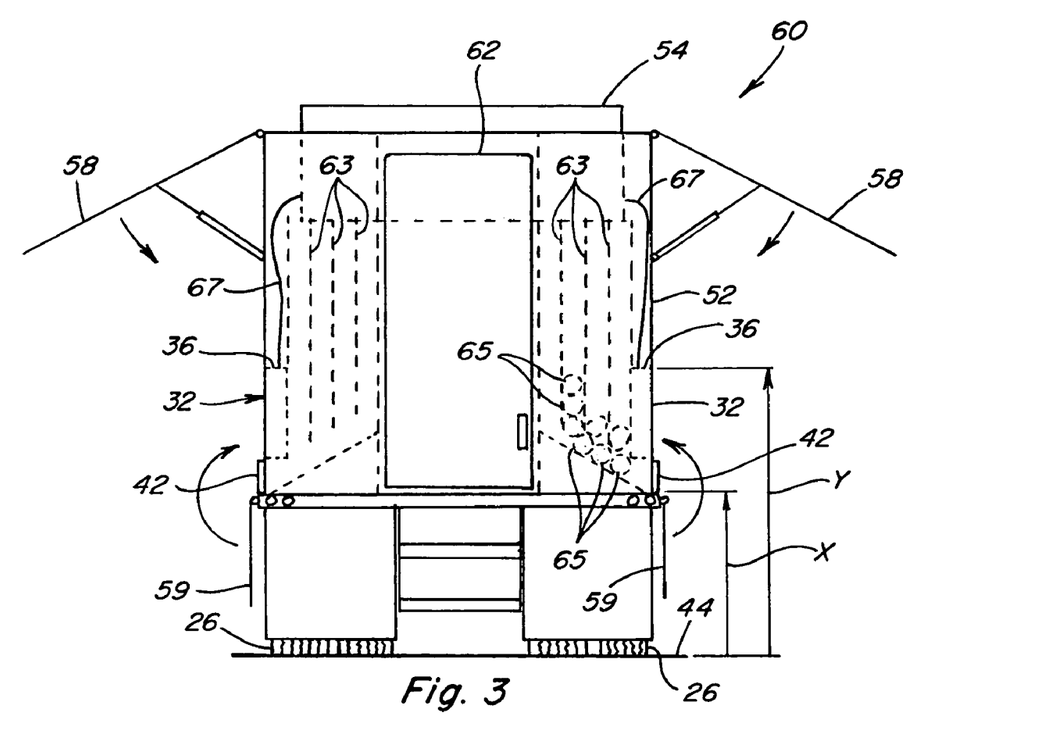
FIG. 3 is a simplified rear view of the apparatus of FIG. 1.

In FIG. 3, another mobile vending apparatus 60 is shown, like parts of apparatus 60 and apparatus 20 being identified by like numbers. Apparatus 60, like apparatus 20, can comprise a truck or trailer and includes vending units 32 on both sides of a refrigerated enclosure 52 including a central refrigeration unit 54, and also a rear door 62 for accessing the interior. Again, units 32 each include a user interface region 36 including the user operable vending controls, contained in an area extending from a distance X above a line 44 representing a lowermost periphery of wheels 26, to a distance Y thereabove, as illustrated, for ease of use and convenience of persons standing on a surface on which apparatus 60 is parked, as explained above. Wheels 26 are again contemplated to be standard pneumatic truck or trailer wheels of at least about 12 inches in overall diameter or vertical extent. Here, product holding elements 63, which can be for instance upstanding rails or slats for holding stacks of products such as cans 65 illustrated, for gravity feeding are shown in connection with vending units 32, for holding products to be vended by units 32 through dispenser outlets 42. Elements 63 are preferably accessible from the interior of enclosure 52 to allow filling and stocking units 32 from the rear. Central refrigeration unit 54 of apparatus 60 as well as that of apparatus 20 can be powered externally such as from an external electrical circuit available on a fair grounds or the like, or it can be powered by an engine of the truck or a separate generator, by an internal engine so as to be self-contained, and/or battery powered. Electrical power wires 67 can extend from unit 54 to vending units 32, to provide power thereto.

Figure 4:
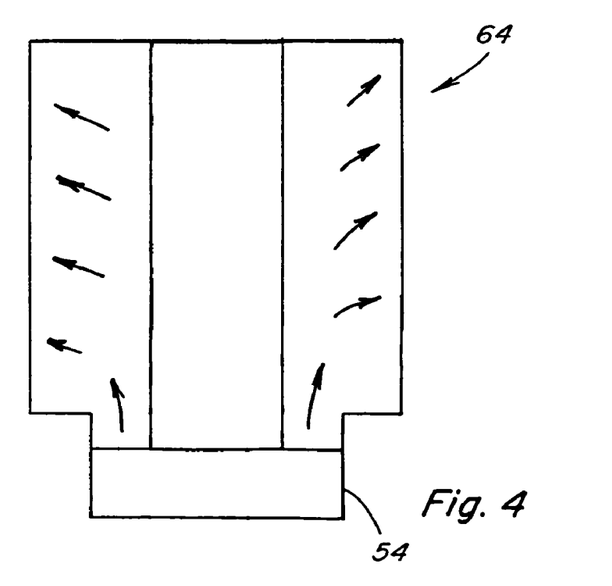
FIG. 4 is a simplified schematic top view of elements of the apparatus of FIG. 1.

FIG. 4 illustrates a possible internal ducting arrangement 64 for use within the refrigerated enclosure 52 of either apparatus 20 or 60, and probable air flow illustrated by arrows, to show that all of the units 32 could be refrigerated by a central refrigeration unit 54, or baffles or the like could be used to bloc flow to one or more of the units, that could be used for non-chilled products, as desired.

Figure 5:
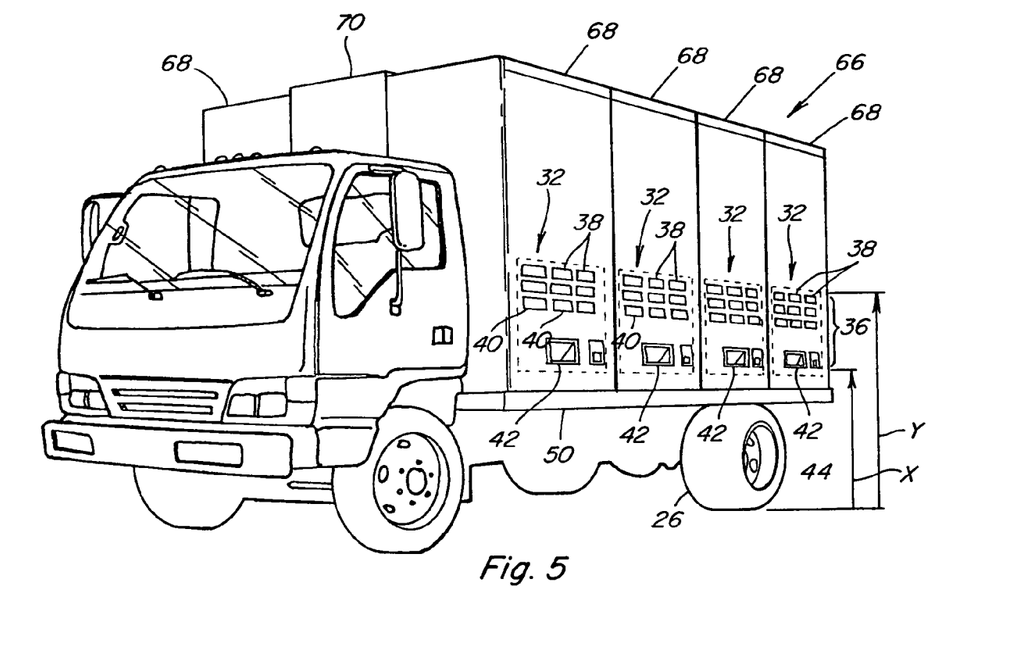
FIG. 5 is a simplified perspective view of another mobile vending apparatus of the invention.

FIG. 5 illustrates still another mobile vending apparatus 66, like parts of apparatus 66, 60 and 30 being identified by like numbers. Here, apparatus 66 is again depicted as including a truck, and individual automatic vending units 32 are shown as parts of individual vending machines 68 located in rows on platform 50 of the truck, user interface regions 36 of the units 32 including controls 38 and 40 and outlets 42 again being contained in an area extending from a distance X above line 44 representing the lowermost peripheral portion of wheel 26, to a distance Y thereabove, as illustrated. Again, wheels 26 are contemplated to be standard pneumatic truck or trailer wheels of at least about 12 inches in overall diameter or vertical extent. A like row of vending machines 68 is shown on the opposite side of platform 50, the rears of the machines forming sides of an enclosure 70 the interior of which can be used for storage, or as an aisle for stocking machines 68 from the rear, in a manner similar to that described in reference to apparatus 60 above.

Figure 6:
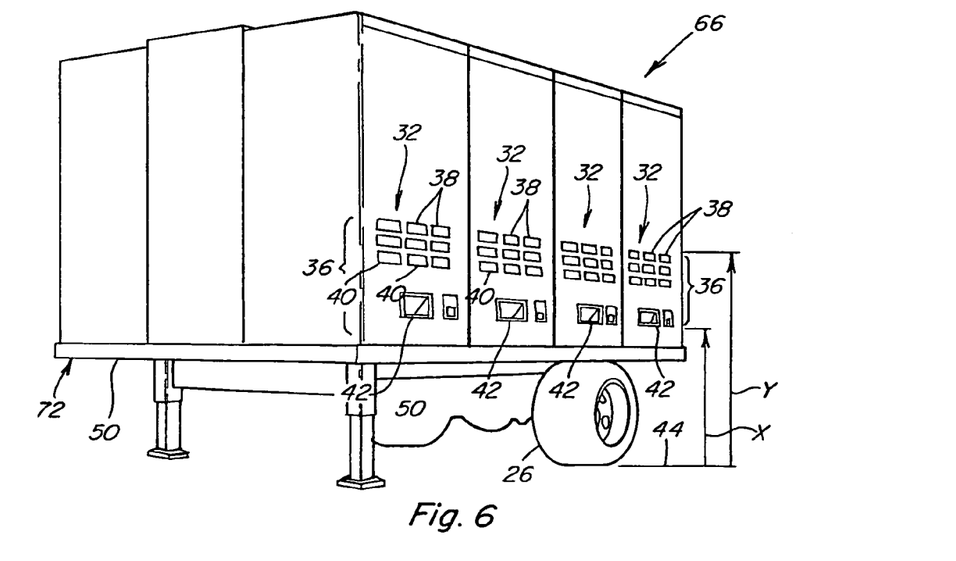
FIG. 6 is a simplified perspective view of another mobile vending apparatus of the invention.
Figure 7:
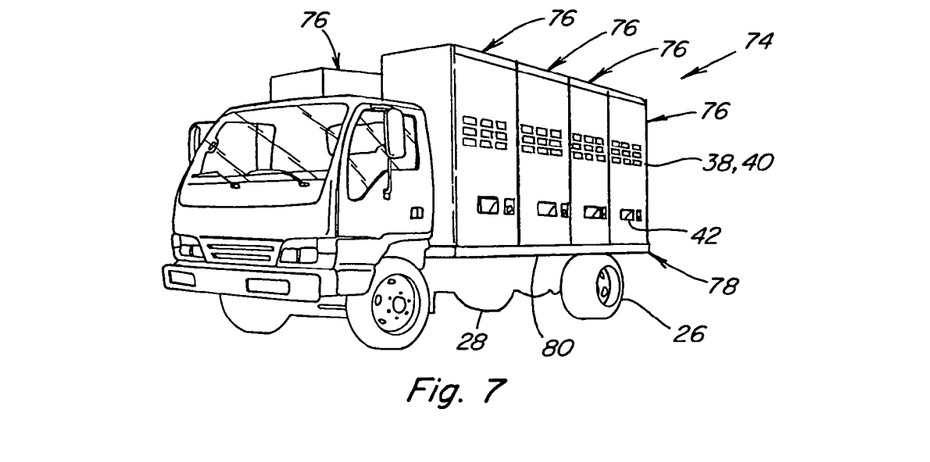
FIG. 7 is a simplified perspective view of another mobile vending apparatus of the invention, showing vending units thereof in a transport position.
Figure 8:
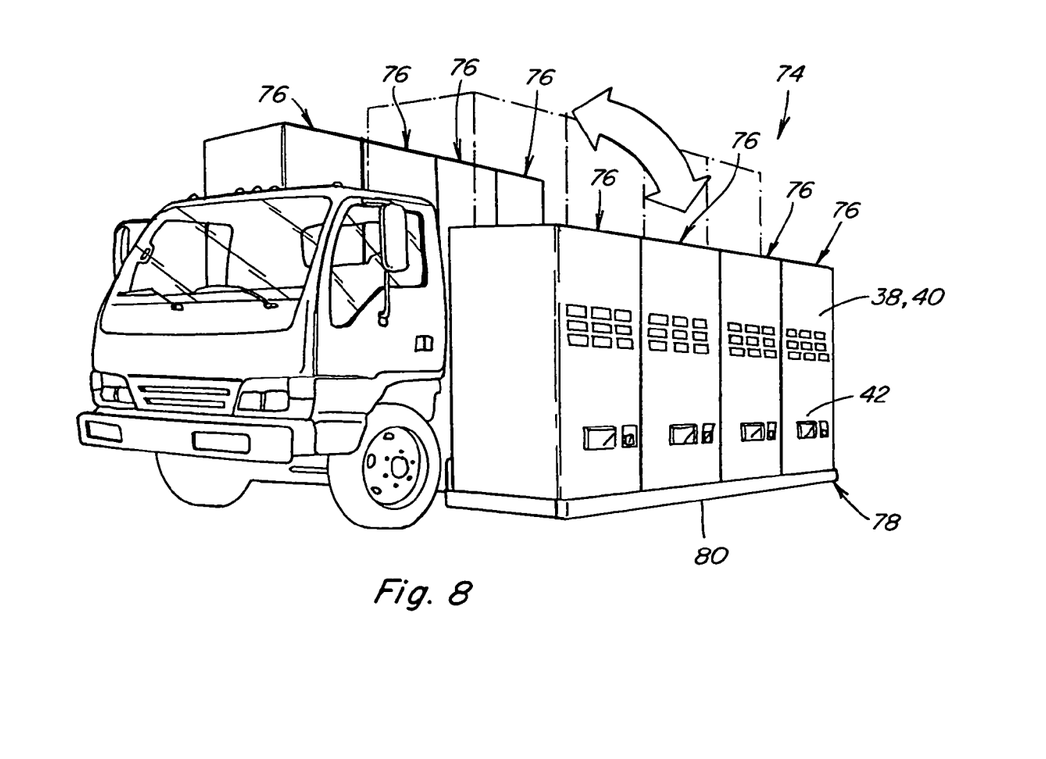
FIG. 8 is a simplified perspective view of the mobile vending apparatus of FIG. 7, showing vending units thereof in a lowered position.
Figure 9:
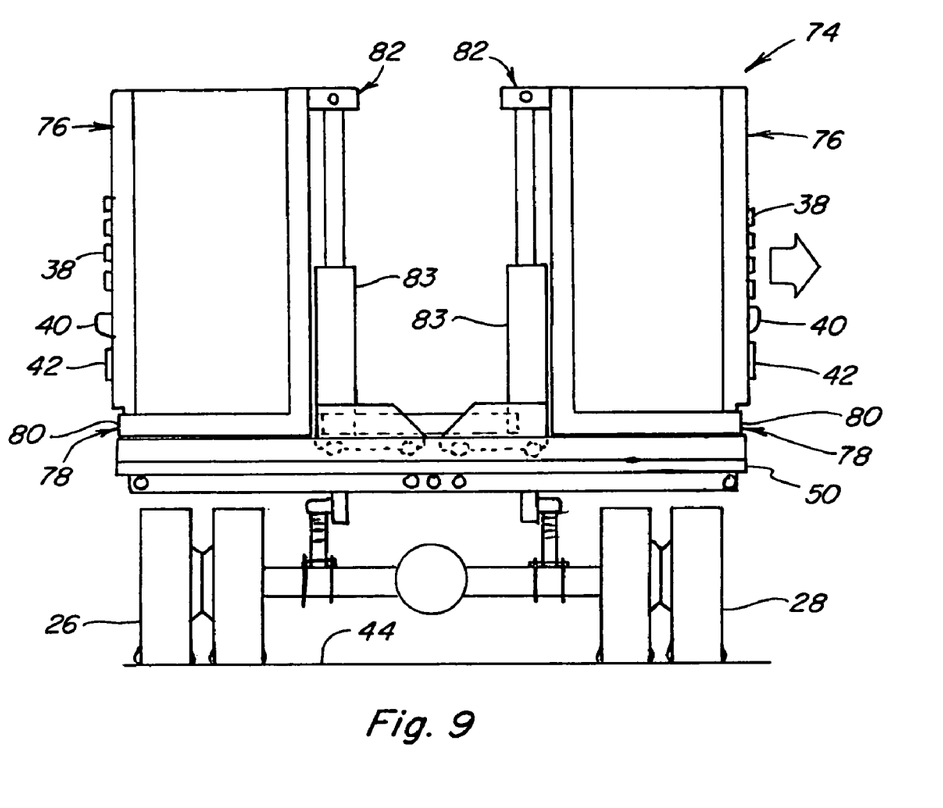
FIG. 9 is a simplified rear view of the mobile vending apparatus of FIG. 7, showing apparatus for raising and lowering vending units thereof.

FIG. 6 shows a mobile vending apparatus 66 on a platform 50 of a trailer 72 towable in the well known manner over roads or the ground to a desired location such as a fair ground, festival ground, park, or the like. Again, user interface regions 36 of the units 32 including controls 38 and 40 and outlets 42 are contained in an area extending from a distance X above line 44 representing the lowermost peripheral portion of a wheel 26, to a distance Y thereabove, as illustrated. Wheels 26 are again contemplated to be standard pneumatic truck or trailer wheels of at least about 12 inches in overall diameter or vertical extent. Here, it should be recognized and understood that mobile vending apparatus 20 and 60 could also include a trailer instead of a truck, as desired. Trailer 72 includes a front end supported in the well known manner by standard drop down legs, so that user interface regions 36 of vending units 32 located adjacent to the front of the trailer will be located at about the same elevation as regions 36 of the more rearward units.

In FIGS. 7, 8, 9, 10 and 11, another embodiment of a mobile vending apparatus 74 is shown, again, like parts of apparatus 74, 66, 60 and 30 being identified by like numbers. Here, a plurality of conventional vending machines 76 are used, each including a front surface having an array of user operable controls including at least a plurality of manually operable product selector controls 38, a payment receiving and validating control 40 for receiving and automatically validating a payment, and a product dispenser outlet 42 through which a product is automatically dispensed when a predetermined payment is received and a product is selected. Controls 38 and 40 and outlet 42 are shown at conventional heights on machines 76, that is, at an elevation wherein at least upper ones of the controls will not be reachable by persons standing on a surface on which wheels 26 of apparatus are located.

Figure 10:
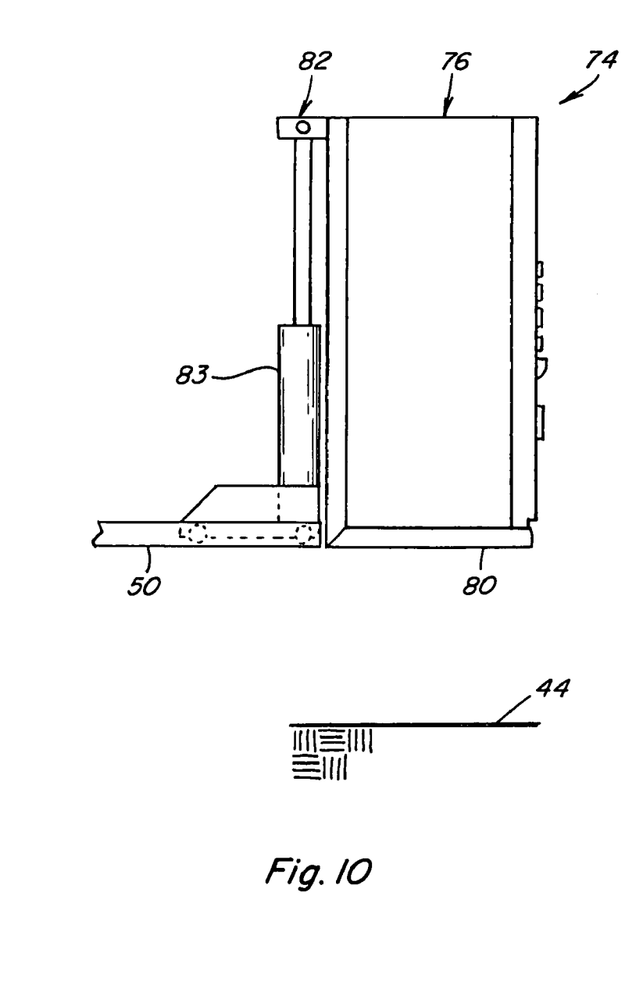
FIG. 10 is a simplified fragmentary rear view of the mobile vending apparatus of FIG. 7, showing details of the apparatus for raising and lowering the vending units.
Figure 11:
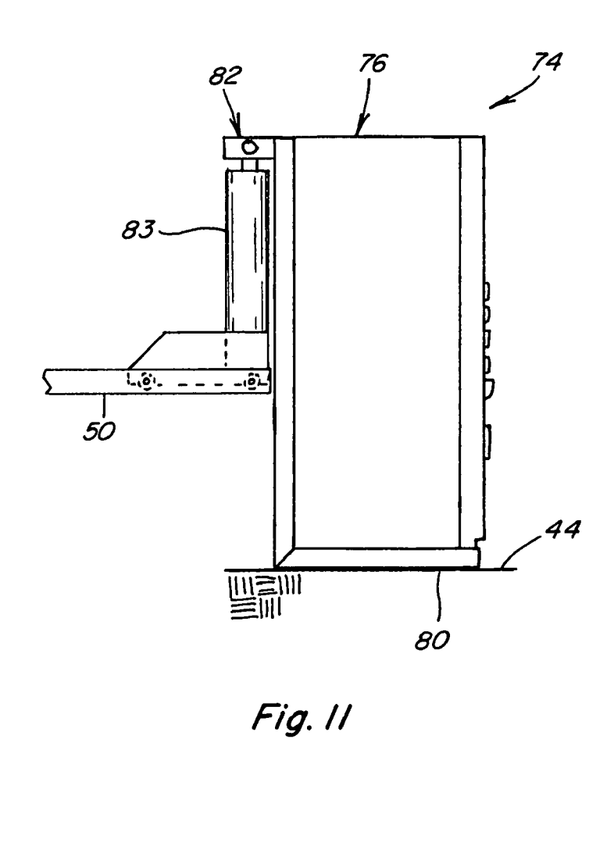
FIG. 11 is another simplified fragmentary rear view of the mobile vending apparatus of FIG. 7, showing the vending units in a lowered position.

To enable use of machines 76 by persons standing on a ground or paved surface on which the apparatus 74 is located, machines 76 are preferably supported on a mobile support structure 78 including at least one movable platform 80 supporting the machines in rows on opposite sides of a platform 50 of a truck including rear wheels 26 and 28 operable for movement over ground and paved surfaces as discussed above. A lift mechanism 82 in connection with the platform 80 is operable for moving the platform between a transport position (FIGS. 7 and 9) wherein the vending machines are spaced above a ground or paved surface represented by line 44 on which the wheels 26 and 28 are located, and a lowered position (FIG. 11) wherein the platform 80 is resting on the ground or paved surface even with line 44, all movements of platform being conducted while maintaining the front surfaces of the vending machines in at least a generally upstanding orientation, as illustrated by the sequence of views. Lift mechanism 82 can include one or more fluid or hydraulic cylinders 83 behind machines 76 and supported for captured side-to-side rolling movement over platform 50 as illustrated in FIGS. 10 and 11. Cylinder or cylinders 83 are retracted to lower platform 80 and machines 76, and are extended to raise them.

Figure 12:
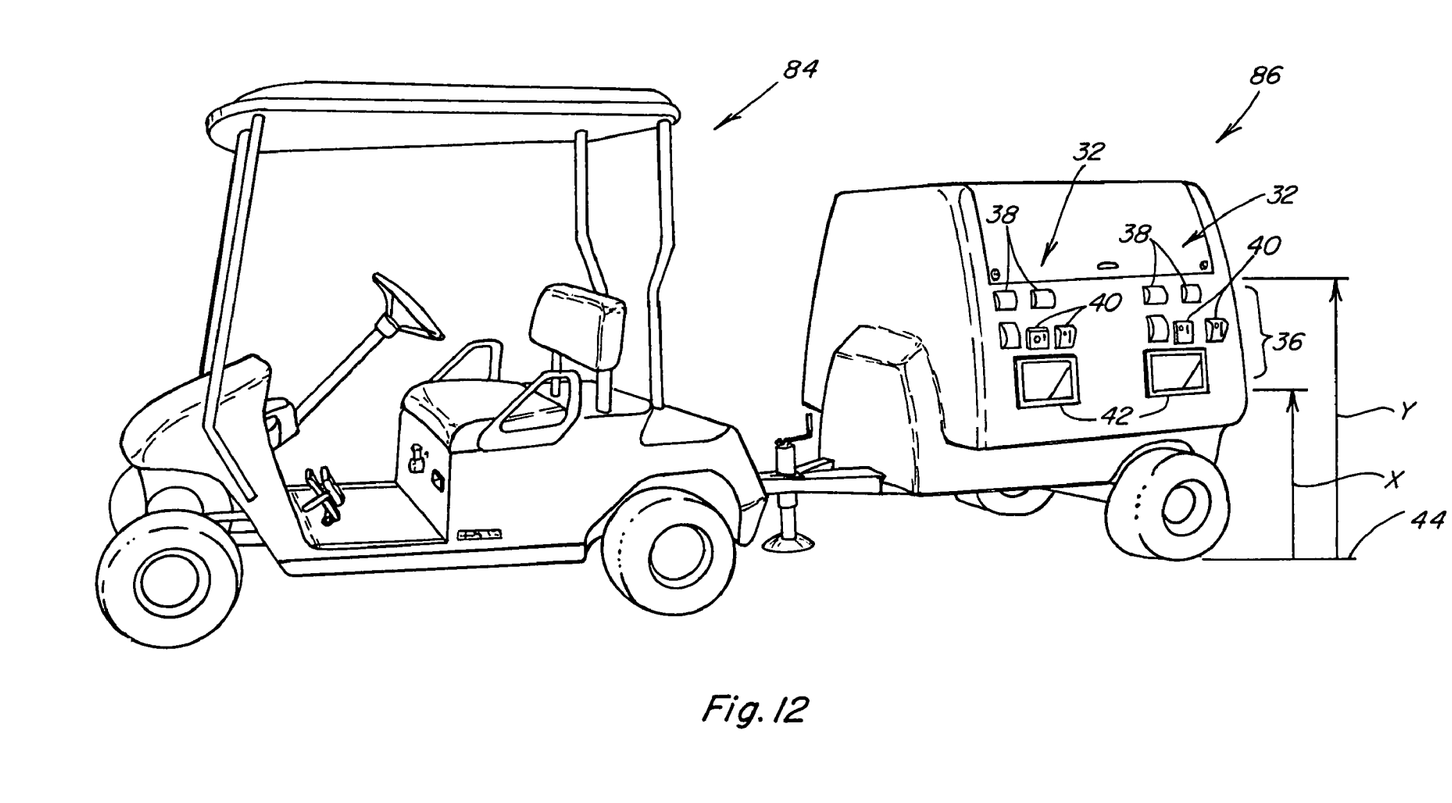
FIG. 12 is a simplified perspective view of a golf cart shown towing a mobile vending apparatus of the invention.

In FIG. 12, a conventional golf car 84 is shown connected to another mobile vending apparatus 86 of the invention, like parts of apparatus 86 and apparatus 20, 60, 66 and 74 being identified by like numbers. Apparatus 86 is a trailer towable in the well known manner over roads or the ground to a desired location such as a fair ground, festival ground, park, or the like. Again, user interface regions 36 of the units 32 including controls 38 and 40 and outlets 42 are contained in an area extending from a distance X above surface 44 to a distance Y thereabove, as illustrated.

Thus, there has been shown and described several embodiments of a novel mobile vending apparatus and system, which overcomes many of the problems set forth above. It will be apparent, however, to those familiar in the art, that many changes, variations, modifications, and other uses and applications for the subject device are possible. All such changes, variations, modifications, and other uses and applications that do not depart from the spirit and scope of the invention are deemed to be covered by the invention which is limited only by the claims which follow.

What is claimed is:

1. A mobile vending apparatus, comprising:
   a plurality of automatic product vending units, each of the automatic product vending units including a front surface having a user interface region including an array of user operable controls including at least one manually operable product selector control, a payment receiving control, and a product dispenser outlet through which a product is automatically dispensed when a predetermined payment is received and a product is selected, the user interface region being located within about a lower one-half of a vertical extent of the front surface of the unit; and
   a mobile support structure supporting the plurality of automatic product vending units disposed in rows on opposite sides of the mobile support structure with the front surfaces of the vending units in at least a generally upstanding orientation and wherein the rows of the vending units form sides of a refrigerated enclosure, the mobile support structure being supported by at least two wheels for movement over ground and paved surfaces with the vending units spaced thereabove, at least one of the wheels being located adjacent to the vending units and including a lowermost peripheral portion, the user interface region of the vending units being contained in an area extending from at least about 10 inches above the lowermost peripheral portion to about 80 inches thereabove.

2. The mobile vending apparatus of claim 1, wherein the mobile support structure comprises a truck.

3. The mobile vending apparatus of claim 1, wherein the mobile support structure comprises a trailer.

4. The mobile vending apparatus of claim 1, further comprising a central refrigeration unit in connection with the enclosure.

5. The mobile vending apparatus of claim 4, wherein the central refrigeration unit includes a power source in connection therewith and with the vending units for supplying electrical power to the controls thereof.

6. The mobile vending apparatus of claim 1, wherein the refrigerated enclosure includes a door openable for accessing an interior of the enclosure.

7. The mobile vending apparatus of claim 1, wherein each of the vending units include product holding elements accessible from an interior of the enclosure to enable stocking the units with products from the interior of the enclosure.

8. The mobile vending apparatus of claim 1, wherein the user interface region is contained in an area extending from at least about 20 inches above the lowermost peripheral portion to about 66 inches thereabove.

9. The mobile vending apparatus of claim 1, wherein the user interface region is contained in an area extending from at least about 24 inches above the lowermost peripheral portion to about 66 inches thereabove.

10. The mobile vending apparatus of claim 1, further comprising a skirt positionable in at least partial covering relation to at least one of the wheels, and alternatively positionable in at least partial covering relation to at least one of the vending units.

11. The mobile vending apparatus of claim 1, wherein the two wheels each have an overall vertical extent of at least about 12 inches.

12. The mobile vending apparatus of claim 1, wherein the two wheels each have an overall vertical extent of at least about 24 inches.

13. The mobile vending apparatus of claim 12, wherein each of the wheels comprises a pneumatic tire.

14. The mobile vending apparatus of claim 1, further comprising a cover panel positionable in covering relation to first portion of at least one of the vending units and in an alternative position extending outwardly from the support structure above the at least one of the vending units, and a skirt positionable in covering relation to a second portion of the at least one of the vending units and in an alternative position in at least partial covering relation to one of the wheels.

15. The mobile vending apparatus of claim 14, wherein the cover panel extends at least generally upwardly when in the alternative position thereof.

16. A mobile vending apparatus, comprising:
a mobile support structure supporting a refrigerated enclosure having at least one upstanding exterior wall including at least one automatic product vending unit thereon, the product vending unit including user operable controls including at least one manually operable product selector control, a payment receiving control for receiving a payment, and a product dispenser outlet through which a product is automatically dispensed when a predetermined payment is received and a product is selected, the set of user operable controls being located within about a lower one-half of a vertical extent of the exterior wall, and the mobile support structure including at least two wheels of at least 12 inches overall diameter each for movement over ground and paved surfaces such that when the mobile structure is parked with the wheels supported on a ground or paved surface the user operable controls will be contained within an area extending from about 10 inches above a surface on which one of the wheels closest to one of the vending units is located, to about 80 inches thereabove, and wherein the refrigerated enclosure includes a door openable for accessing an interior of the enclosure, and each of the vending units include product holding elements accessible from the interior of the enclosure for stocking the units with products.

17. The mobile vending apparatus of claim 16, wherein when the mobile support structure is parked with the wheels supported on a ground or paved surface the vending unit will be contained within a vertical area extending from about 20 inches above a surface on which one of the wheels closest to the vending unit is located, to about 66 inches thereabove.

18. The mobile vending apparatus of claim 16, wherein when the mobile support structure is parked with the wheels supported on a ground or paved surface the vending unit will be contained within a vertical area extending from about 24 inches above a surface on which one of the wheels closest to the vending unit is located, to about 66 inches thereabove.

19. The mobile vending apparatus of claim 16, wherein the mobile support structure comprises a truck.

20. The mobile vending apparatus of claim 16, wherein the mobile support structure comprises a trailer.

21. The mobile vending apparatus of claim 16, comprising a plurality of the vending units disposed in rows on opposite sides of the mobile support structure.

22. The mobile vending apparatus of claim 16, wherein the mobile support structure includes a skirt positionable in at least partial covering relation to at least one of the wheels, and alternatively positionable in at least partial covering relation to at least one of the vending units.

23. The mobile vending apparatus of claim 16, further comprising a cover panel positionable in covering relation to first portion of at least one of the vending units and in an alternative position extending outwardly from the support structure above the at least one of the vending units, and a skirt positionable in covering relation to a second portion of the at least one of the vending units and in an alternative position in at least partial covering relation to one of the wheels.

* * * * *